Nov. 11, 1958   J. JEAN-MARIE J. GÉRIN   2,859,925
AUTOMATIC BALANCING ARRANGEMENT FOR AIRCRAFT CONTROL
Filed Sept. 14, 1954   7 Sheets-Sheet 1
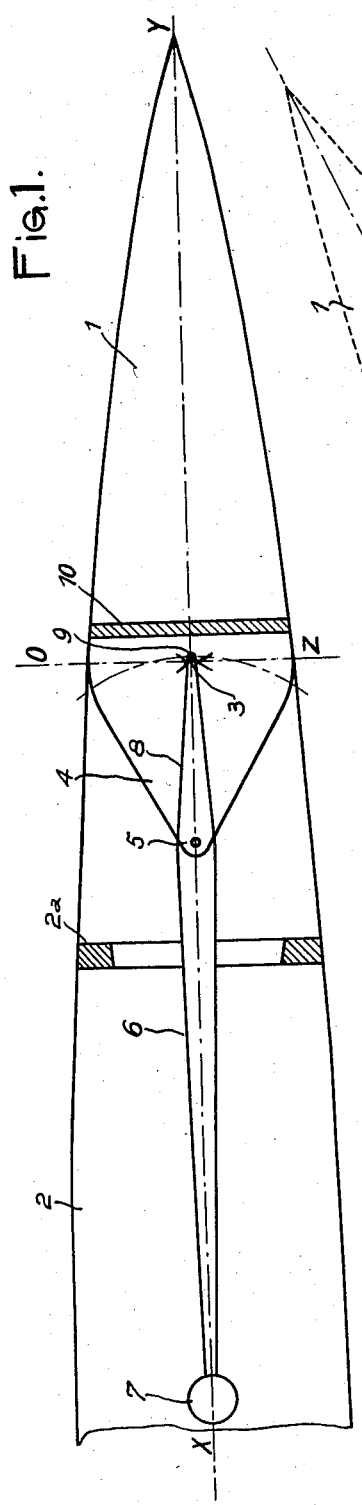
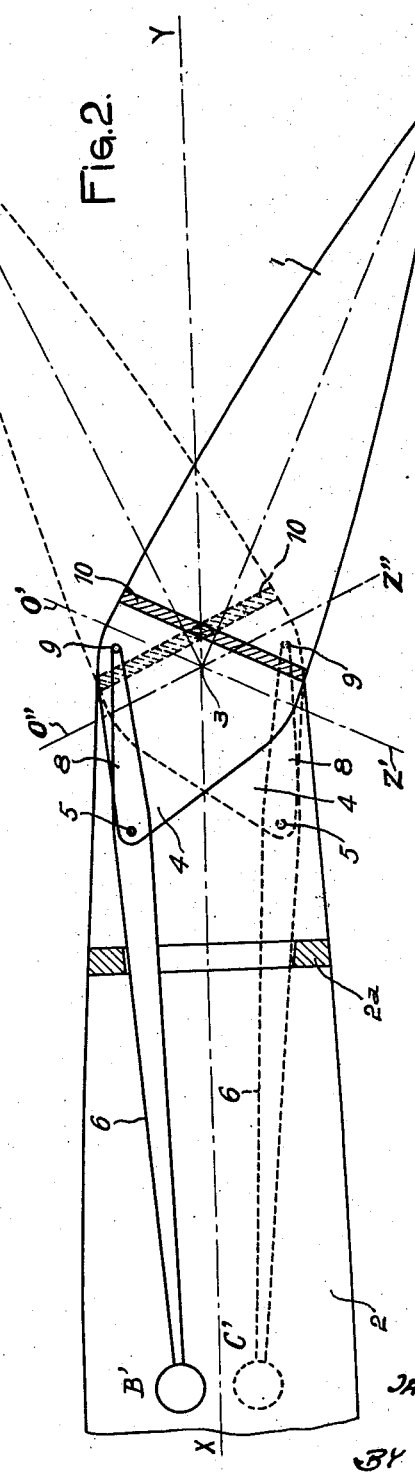
INVENTOR:
JACQUES, JEAN-MARIE, JULES
GERIN
BY Leon M. Strauss
AGT.

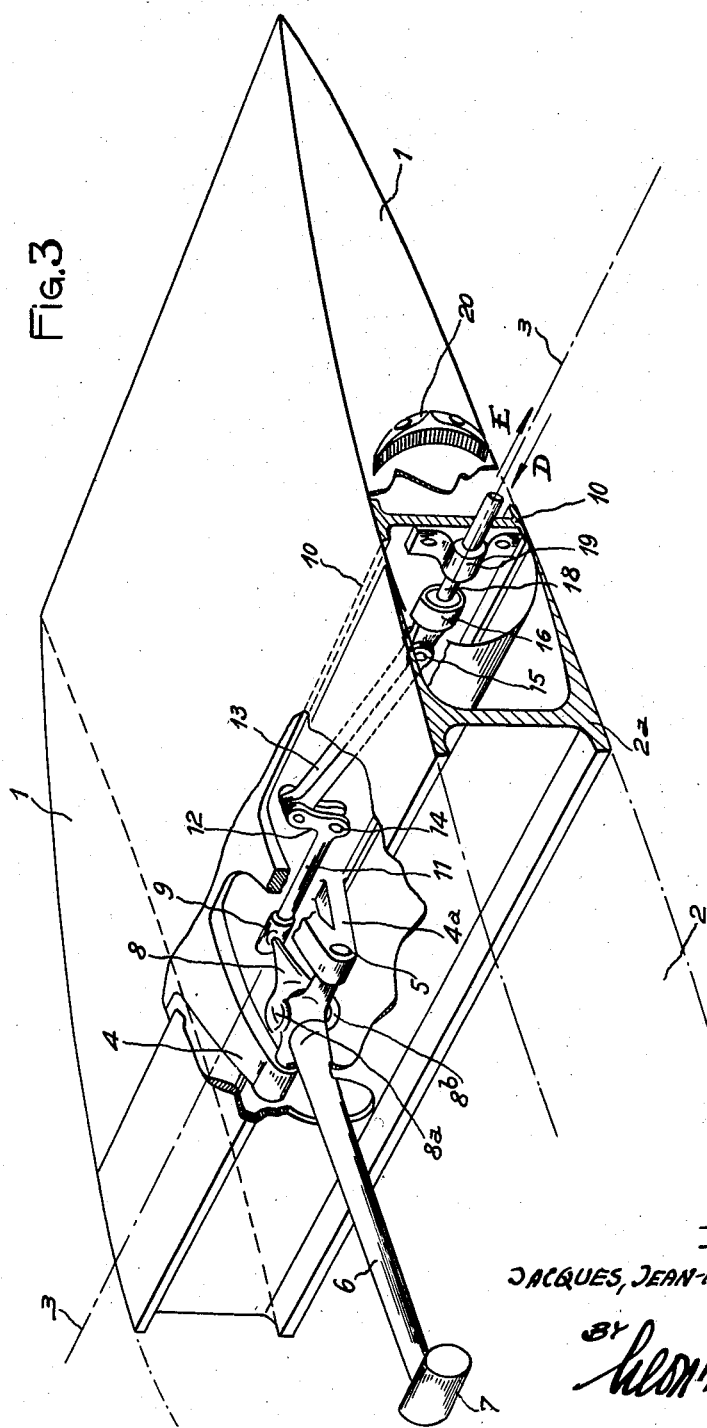

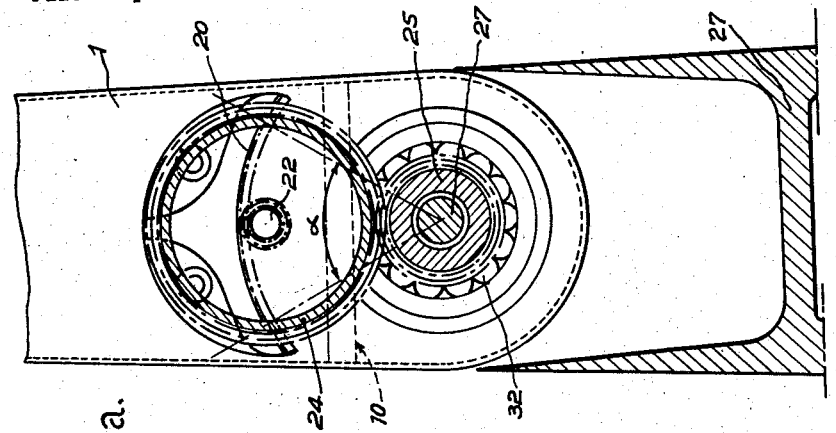
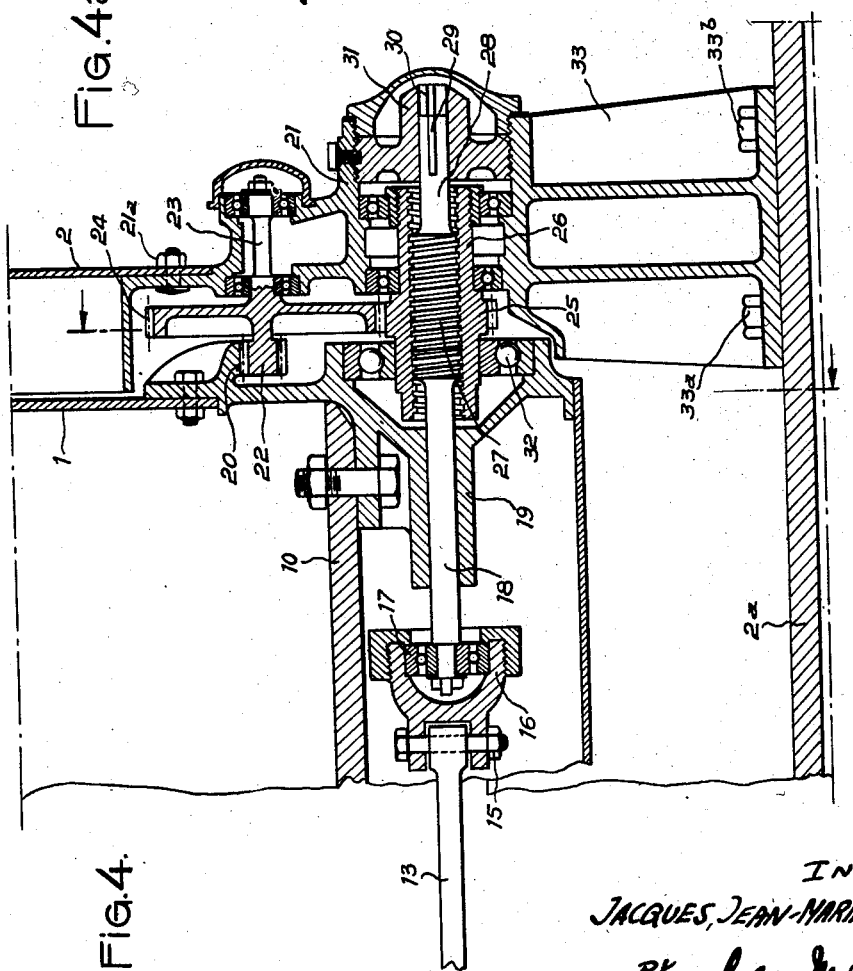

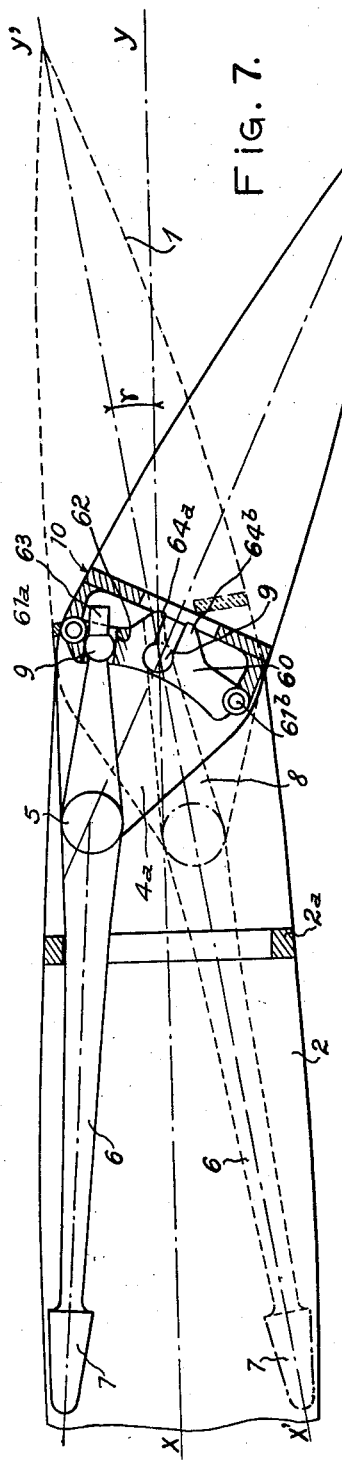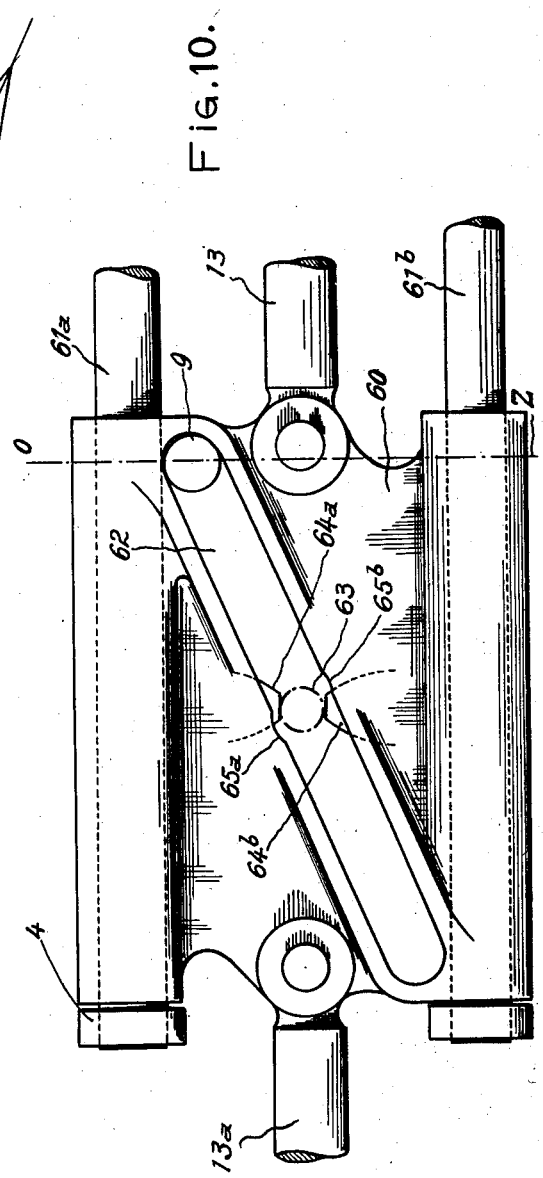

Nov. 11, 1958  J. JEAN-MARIE J. GÉRIN  2,859,925
AUTOMATIC BALANCING ARRANGEMENT FOR AIRCRAFT CONTROL
Filed Sept. 14, 1954  7 Sheets-Sheet 6
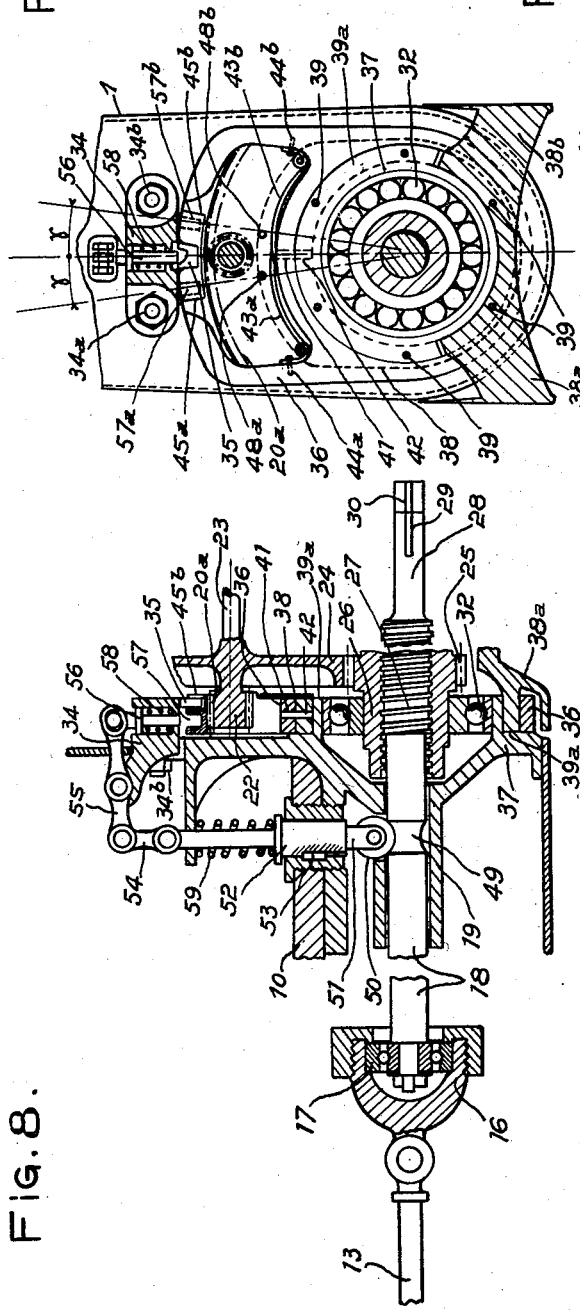
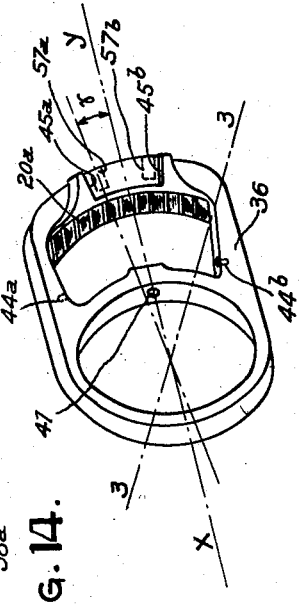
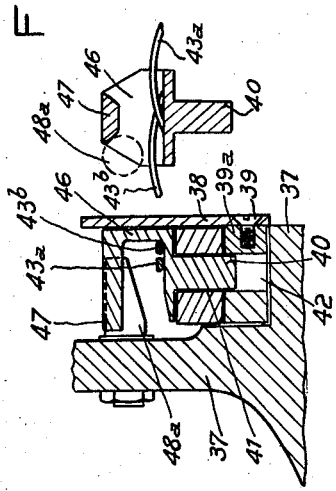
INVENTOR:
JACQUES, JEAN-MARIE
JULES GERIN

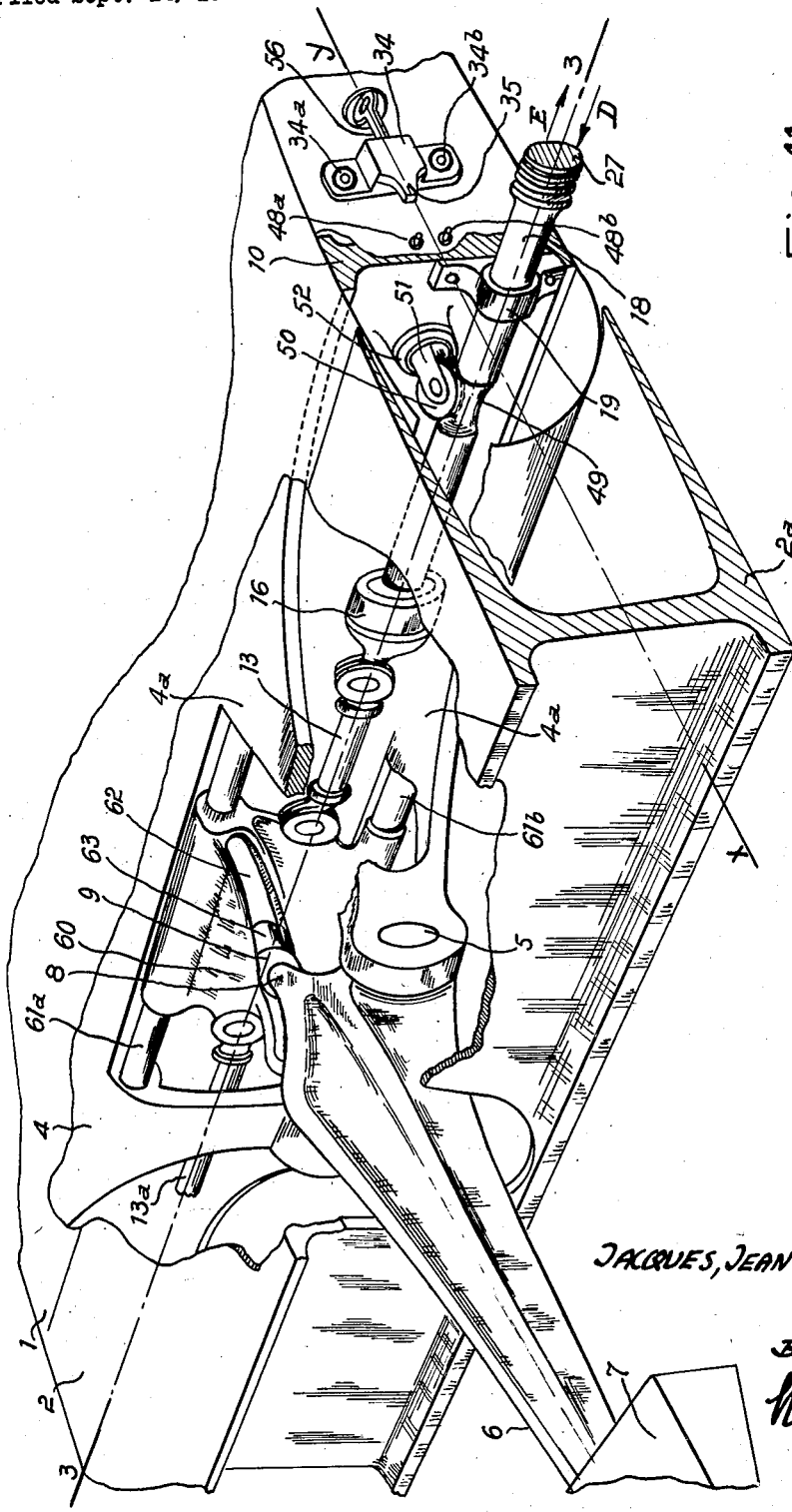

United States Patent Office 2,859,925
Patented Nov. 11, 1958

2,859,925
AUTOMATIC BALANCING ARRANGEMENT FOR AIRCRAFT CONTROL

Jacques Jean-Marie Jules Gérin, Boulogne-sur-Seine, France

Application September 14, 1954, Serial No. 456,047

Claims priority, application France September 17, 1953

5 Claims. (Cl. 244—75)

The present invention has for its object to provide an automatic balancing arrangement for the control-surfaces of aircraft, such as ailerons, elevator controls, horizontal flaps, rudder controls, etc.

At the present time, two solutions are generally adopted to solve the problem of balancing of these control-surfaces or flaps. The first solution consists in fixing underneath the wing section or the horizontal tail unit, and on the exterior of these surfaces, a balancing mass or counterweight at the extremity of an arm cranked at 90°, the arm extending for a sufficient distance towards the front and sufficiently below the airfoil section for the weight of the counter-weight to balance the weight of the control fin, and also so that the said fin can carry out its movements. This solution has a number of drawbacks, especially from the point of view of weight and, in particular, from the aerodynamic point of view.

The second solution consists in housing the balancing mass within the limits of the depth of the section of the wing, for example, allowance being made for the movement of the control-surface. The space available for that purpose is extremely small in spite of the low value of the total angle of movement of the control-surface. It follows that, since the balancing mass is placed very close to the pivotal axis of the control-surface, a considerable weight must necessarily be used. In order that the control-surface may be "over-balanced," it is even necessary that this mass should be constituted by a metal of very high density and of a special alloy which has not only the disadvantage of a considerable increase in the weight of the wings, but also that of being very expensive.

The object of the present invention is to provide a remedy for these drawbacks by producing an automatic balancing arrangement for aircraft control-surfaces, which is essentially constituted by at least one counter-weight arranged at the extremity of a lever-arm of sufficient length for the mass of the said counter-weight to be as small as possible, this lever not being rigidly connected to the control but pivotally-mounted upon it, and being operated by a suitable device in such manner that, when the control-surface pivots in a given direction, the lever pivots in the opposite direction, whereby, for every angular position of the control-surface, there will correspond a position of the balancing lever which is always contained within the limits of space in the wing or other member within which this lever is housed.

In accordance with one form of embodiment, it is the pivotal movement of the control-surface itself which operates the pivotal action in the opposite direction of the balancing lever with respect to itself.

To this end, and in accordance with a first form of embodiment of the invention, the control-surface is provided with a toothed segment engaged with a step-down train of gears adapted to rotate a longitudinally-fixed nut which operates in its turn the lateral movement of a threaded shaft, rotation of which is prevented, the said shaft producing, through the medium of any suitable system of levers, the desired pivotal movement of the balancing lever with respect to the control-surface.

A further object of the invention is its application to high-speed aircraft. In the kind of balancing arrangements of the invention, which are applicable to all types of aircraft, it is the control-surfaces themselves which, as they pivot, control the pivotal movement of the balancing lever, this control being effective irrespective of the total angles of movement of the control-surfaces in question. It is known that the angular movement of a control-surface is of very small amplitude during normal flight, especially in the case of high-speed aircraft. This angular movement is sufficient to effect all the normal evolutions at high-speed, evolutions during which the pilot wishes to have the smoothest possible system of control.

In accordance therefore with a further form of embodiment of the invention, and with the object of obtaining the smoothest possible control system, the balancing lever is mounted in such manner as to be momentarily integral with the movement of a control surface or other equivalent member when the total angle of movement is of very small value, so that the control-surface may oscillate freely without connection with the operating device of the balancer, the latter taking up corresponding positions inside the section of the wing or of the member inside which it is mounted, this position being in the axis of the extension of the control-surface.

The control-surface, or other equivalent member, is provided with a suitable device by means of which, when the angle of movement exceeds a certain value, the said device comes into contact with an arrangement enabling the position of the balancing lever to be varied in such a manner that it remains inside the section of the member within which it is housed, whilst at the same time the balancing of the said control-surface is effected.

In accordance with an advantageous form of embodiment, when the angle of movement of the control-surface exceeds its angle of movement during normal flight or high-speed flight, the control-surface is engaged with a member which operates, by any known means, the extremity of the balancing lever in such a manner as to cause this lever to take up an angle of movement of its own.

There will be described below examples of the application of the invention to an aircraft wing and its aileron as well as forms of embodiment of the various control arrangements, the description being made with reference to the attached drawings in which:

Fig. 1 is a view in vertical cross-section of an aircraft wing, showing diagrammatically a control fin or aileron in the neutral position, the wing being provided with a balancing lever in conformity with the present invention.

Fig. 2 is a view similar to that of Fig. 1 and showing the aileron in its two extreme positions, pivoted downwards and upwards.

Fig. 3 is a perspective view of a section of a wing with the corresponding portion of the aileron, the wing being shown partly broken away so as to show the control device for the balancing lever, in accordance with the invention.

Fig. 4 is a view in horizontal cross-section showing the control arrangements in accordance with the invention, in detail.

Fig. 4a is a view in elevation of a detail of Fig. 4.

Figure 5:
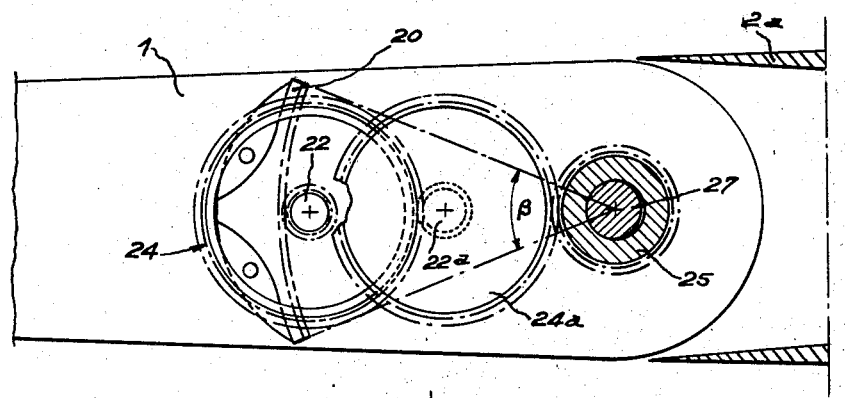
Fig. 5 is a view similar to that of Fig. 4a but showing an alternative form of construction.

Fig. 7 is a view in vertical cross-section of an aircraft wing showing diagrammatically, in dotted lines, an aileron having a very small angle of movement with respect to the chord of the wing, this angle being normally sufficient to carry out all evolutions in normal high-speed flight, the balancing arrangement being in a corresponding position; and in full lines, the same aileron making a greater angle with the chord of the wing, whilst the balancing arrangement is also shown in its corresponding position.

Fig. 8 is a view in horizontal cross-section showing in detail a device for operating the balancer, in accordance with the invention, and following an alternative form of construction.

Fig. 9 is a view in elevation of a detail of Fig. 8.

Fig. 10 is a view to a larger scale of a detail of Fig. 11.

Fig. 11 is a view in perspective of a section of wing with the corresponding portion of the aileron, the wing being shown partly broken away so as to enable the control device for the balancing lever to be seen.

Fig. 12 is a detail view of the toothed control segment which should have been shown mounted on the X—Y axis of Fig. 11, and which has been removed for the sake of clearness in the drawing.

Figs. 13 and 14 are views to a large scale of members which have not been shown on Fig. 8, to avoid complication of the latter.

Figure 6:
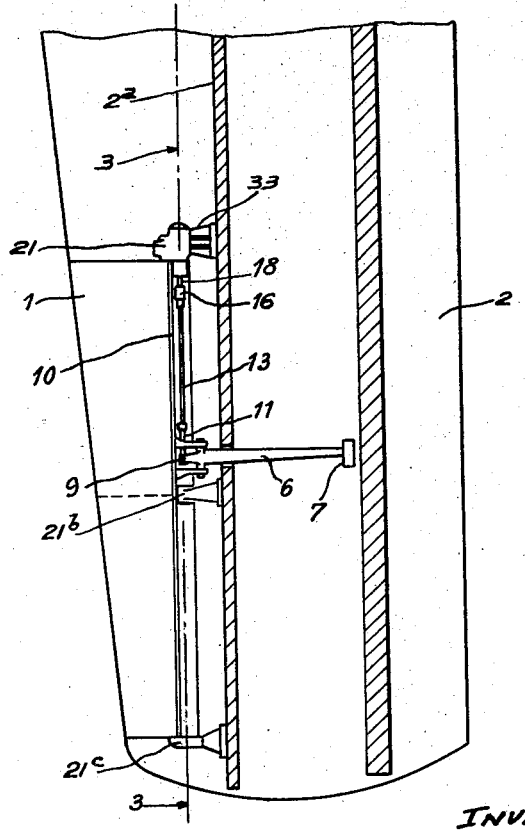
Fig. 6 is a plan view of an aircraft wing provided with the automatic balancing arrangement, in accordance with the invention.

As can be seen from Figs. 1, 2 and 3, a control-surface 1, mounted in the extension of a wing 2 comprising a false spar 2a, is adapted to pivot around a pivotal axis 3. This control-surface 1 comprises a spar 10 placed slightly to the rear of the pivotal axis 3 and has forwardly-extending arms 4 and 4a, so arranged as to remain continually inside the profile of the wing during the movements of the control-surface. As shown in Fig. 6, the control-surface 1 is carried by three bearing supports 33, 21b, and 21c, which are mounted on the false spar 2a of the wing 2 (see Fig. 6).

The arms 4 and 4a carry the axis 5 of a lever 6, the long arm of which extends towards the front of the wing and carries at its extremity a counter-weight 7. The small arm 8 of the lever 6 terminates in a ball-joint 9 housed in a socket. The arrangement of the lever 6 is such that when the aileron 1 is in the neutral position, as shown in Fig. 1, the lever 6 is located along the median line X—Y of the section of the wing.

It will be readily understood that if the lever 6 were entirely rigid with the aileron 1, the counter-weight 7 would come into abutment with the walls of the wing when the aileron is pivotally displaced in one direction or the other, and the full normal travel of the aileron would thus be prevented. It is to avoid this that the lever 6 is pivotally-mounted at 5 and that its pivotal movement around this axis 5 is controlled by a device which will be described below, and by virtue of which, for each angular position of the aileron 1, there corresponds a position of the balancing lever which is always contained within the limits of the wing and preferably in the vicinity of the central line X—Y, the maximum amplitude of the displacements of the counterweight 7 being represented by the distance between the points B' and C' (see Fig. 2) corresponding respectively to the extreme positions of the aileron, namely, turned downwards (as shown in full lines) or directed upwards (as shown in dotted lines), the direction of pivotal movement of the aileron and of the lever being opposite to each other.

To this end, the arrangement in accordance with the invention comprises a bell crank-lever, the long horizontal arm 11 of which carries the casing of the ball-joint 9, the small arm 12 being pivotally attached to a connecting-rod 13. The arm 11 is arranged in any known manner so as to be able to move readily away from the vertical plane containing the axis 3 and will, for example, be constituted by a flexible blade. In addition, the small arm 8 is pivotally-mounted on the lever 6 by means of a forked member and two bearings 8a and 8b (see Fig. 3).

The bell crank-lever pivots about an axis 14 carried on the spar 10 of the aileron 1. The other extremity of the connecting-rod 13 is pivoted at 15 to the cheek of a casing 16 containing a thrust bearing 17 (Figs. 3 and 4), this bearing being, for example, of the type having deep grooves. The bell crank 11—12, the rod 13 and the bearing 16—17 constitute motion transmission means the function of which will be more fully explained hereinbelow.

An internal shaft 18, the axis of which coincides very exactly with the pivotal axis 3 of the aileron 1, and on which the thrust bearing 17 is fixed, is carried by a sleeve 19 rigidly secured to the spar 10 of the aileron 1 (see Fig. 3).

On the other hand, the aileron 1 carries on its lateral rib a toothed segment 20 (Figs. 3 and 4), the centre of which is the pivotal axis 3 of the aileron 1.

A casing 21 (Fig. 4) is fixed by means of bolts 21a to a portion of the wing 2 and by means of a support 33 and further bolts 33a and 33b to the false spar 2a. This casing 21 comprises a very small pinion 22 mounted on a shaft 23 and engaging with the toothed segment 20. On the same shaft 23 as the pinion 22, there is formed a much larger pinion 24. This large pinion 24 engages with a small pinion 25 formed on a hollow shaft 26. This hollow shaft is provided with an internal square-threaded portion comprising, for example, a square thread of very small pitch, which is adapted to receive the threaded end 27 of the shaft 18. This shaft 18 is extended on the far side of the square-threaded screw by a shaft 28 provided with a key 29, this key being formed to slide in a groove 30 cut in a fixed sleeve 31 which is integral with the casing 21. The threaded shaft 18—27, the hollow shaft 26 and the gears 20, 22, 24 and 25 constitute actuating means for the above-mentioned motion transmission means.

On the other hand, a large ball bearing 32, which ensures perfect centering of the members, one portion forming part of the aileron 1 and the other of the wing 2, may also serve as a bearing block.

The arrangement in accordance with the invention operates in the following manner:

The smallest angular movement of the aileron 1 produces, through the medium of the segment 20, rotation of the very small pinion 22 and this pinion, through the intermediary of the large pinion 24, considerably multiplies this initial angular displacement whilst operating the pinion 25 of the hollow shaft, which pinion causes the screw 27 to advance or move back in the direction of the arrows D, E (Fig. 3), respectively, since the screw is prevented from turning by the key 29. As the screw 27 is cut on the shaft 18, this shaft pulls or pushes the thrust block 16 which communicates its movement to the connecting-rod 13, and through the medium of the two arms 11 and 12 of the bell crank-lever, to the ball-joint 9 and to the lever 6, which is then displaced in a direction opposite to the direction of pivoting of the aileron 1.

The transmission ratios of the speed-reduction gears, of the pitch of the screw 27 and the levers are chosen in such a manner that the total displacement of the segment 20 gives rise to a corresponding displacement of the lever 6 from B' to C' (Fig. 2), without exceeding the limits imposed by the wing dimensions, and preferably, a displacement of small amplitude about the centre line X—Y of the profile of the wing.

The pitch of the screw 27 will be made very small and will be chosen so as to be irreversible; that is to say, the forces due to the counter-weight 7, which are converted into a thrust or a tractive effort on the thrust bearing 16, 17, cannot be converted to a rotational movement of the screw 26 and, in consequence, to an angular movement of the aileron.

It may be observed that the use of ball bearings is an advantage for all these pivotal movements, since the risk of play is thus avoided. On the other hand, play in the gears cannot have any troublesome result since it is limited to the pinions alone. From the square-threaded screw onwards, there is no appreciable play. However, if so required, the pinions may be provided with double-helical teeth which practically eliminate all play in the gears; but pinions with straight teeth and having a very small module will be adequate in the great majority of cases.

A further form of embodiment consists in the introduction of a double pinion 22a and 24a as an additional member in the train of reduction gears so as to increase the sensitivity of the mechanism (see Fig. 5), in spite of the fact that the total angle of movement is smaller.

In fact, in the arrangement shown in Fig. 4a, there is obtained an angle α of 60°, whilst this angle is 44° in the case of the arrangement shown in Fig. 5 (angle β). In the case where the supplementary double pinion is used, the pitch of the square-threaded screw 27 can be smaller and the casing would have a larger volume.

In accordance with the form of embodiment shown in Figs. 7 to 11, a wing 2 comprising a false spar 2a is extended in the form of a control-surface or aileron 1 adapted to pivot about a pivotal axis 3. This aileron 1 comprises a spar 10 placed slightly to the rear of the axis 3 and is extended to form arms 4 and 4a arranged in such manner that they continually remain within the interior of the section of the wing during the movements of the aileron.

The arms 4 and 4a support the axis 5 of a lever 6, the long arm of which is directed towards the front of the wing and carries, at its extremity, a counter-weight 7. The shorter arm 8 of the lever 6 is terminated by a ball-joint 9, the function of which will be referred to later. The arrangement of the lever 6 is such that when the aileron 1 is in the neutral position (in line with the X—Y axis) or in a position forming an angle α with this axis, the lever is located in the extension of the axis X'Y' of the aileron, which position is shown in dotted lines in Fig. 7.

It will at once be understood that if the aileron 1 were to make an angle greater than the angle α with the X—Y axis, then due to the ball-joint 9 being rigidly coupled to the aileron 1, the counter-weight 7 would come into abutment with the walls of the wing and would prevent further movement of the aileron. It is to avoid this drawback that the lever 6 is pivoted at 5 and that its pivotal movement about the axis 5 is controlled, starting from a position at which the total angle of movement is greater than 2α, by a device which is described below and whereby, for every angular position of the aileron 1, there will correspond a position of the balancing lever which is always included within the limits of the wing, the direction of the pivotal movement of the lever and the aileron being opposite to each other.

This control of the balancing lever in respect of total angular movements of the aileron equal to 2α, is due to the fact that the movement of a control has a very low amplitude during normal flight, especially in the case of high-speed aircraft, and that the pilot of an aircraft wishes to have the smoothest possible operation of the controls during evolutions at high-speed. This small angle of movement is furthermore sufficient in practice to carry out all the normal evolutions at high-speed. It would therefore be an advantage to lock the lever 6 in its corresponding position so as to effect directly the balancing of the aileron.

On the other hand, at the moment when the pivotal movement of the controls exceeds the angle α, which is the case during evolutions at low speed or on the ground, a clutch arrangement comes into action with a device controlling the counter-weight in order that, when the aileron has reached the limit of its travel, the assembly is located in the position shown in full lines in Fig. 7.

In order to obtain this result, a member 34 is fixed by means of bolts 34a and 34b to the lateral rib of the aileron 1 (Figs. 8, 9 and 11). This member 34 is provided with a finger 35. In addition, a member 36 (Fig. 12) which can also be seen on Figs. 8 and 9, and the position of which will be fixed along the axes X—Y and 3 of Fig. 11, is adapted to pivot about the external bearing surface of a ring 39a which is, in turn, centered on the portion 37 of a sleeve 19 formed integrally with the spar 10 of the aileron 1. This sleeve 19, which, furthermore, is only shown diagrammatically in Fig. 4, is provided with an internal ball bearing 32. Ring 39a is connected with the wing 2 by means of two arms 38a and 38b, the ring thus being integral with the wing but not with the control-surface 1.

The member 36 which is centered on the axis 3, is provided with a toothed segment 20a and is held in position on its bearing surface by a washer 38 (shown in dotted lines in Fig. 9) fixed by means of screws 39 on the face of the supporting ring 39a. This member 36 is further fixed by a lower push-rod 40 shown to a large scale on Figs. 13 and 14 but not shown in Figs. 8 and 9. Only the bore 41 on the moving portion 36 and its housing 42 on the fixed portion are shown in Figs. 8, 9 and 12. The lower push-rod 40 is held against its seating by means of two light spring blades 43a and 43b fixed by screws at 44a and 44b.

The member 36 is provided with two abutments 45a and 45b between which the finger 35 is able to move freely with an angular displacement on each side of the X—Y axis equal to the angle α. If the aileron 1 and, in consequence, the finger 35, exceeds the angle α, the finger comes into contact with the face of the abutment 45a, for example, and tends to carry with it the member 36. But, in order that this pivotal movement may take place, it is essential that the lower push-rod 40 should be freed from the housing 42. To this end, the push-rod 40 carries a U-shaped member 46, 47; the vertical limb 46 is supported against the washer 38, the diameter of which is greater over the entire width of the opening in the member 36, and serves as a guide for the lower push-rod, preventing it from rotating. The horizontal limb 47 co-operates with a cam 48a or 48b fixed to the lateral rib of the aileron, as is also, moreover, the finger 35.

The cams 48a and 48b are locked in such positions that, by raising the lower push-rod 40 in either direction of rotation, they free the member 36 at the moment when the finger 35 comes into contact with the abutment 45a.

A casing, which has not been shown in detail for the sake of clearness in the drawings, and which would be fixed by means of bolts to a part of the wing 2 and through the intermediary of supports or of any other known means to the false spar 2a, comprises a very small pinion 22 carried by a shaft 23 and engaging with the toothed segment 20a. A much larger pinion 24 is formed on the same shaft 23 as the pinion 22.

This pinion 24 engages with a small pinion 25 formed on a hollow shaft 26. This hollow shaft is provided with an internal thread of very small pitch which is intended to receive the threaded portion 27 of a shaft 18, the axis of which coincides very exactly with the pivotal axis 3 of the aileron 1. This shaft, on which is fixed a casing 16 containing a thrust bearing 17 of known type, is carried by the sleeve 19 integral with the spar 10 of the aileron 1.

The shaft 18 is, in addition, provided with an annular groove 49 and is extended, at the other side of the screw, by a portion 28 of a shaft fitted with a key 29, this key being adapted to engage in a groove 30. In addition, a large ball bearing 32 ensures perfect centering of the members and may also serve as a bearing block.

The groove 49 of the shaft 18 co-operates, in addition, with a roller 50 carried by a fork 51 supported by the aileron 1. This roller comprises a guide 52 (see Fig. 8), retained by a key 53, and is connected through the intermediary of a small rod 54 and a lever 55 to an upper push-rod 56 which is located behind the finger 35. Return springs 58 and 59 are applied against the roller 50 on the one hand, and the push-rod 56 on the other, as will be seen below. Housings 57a and 57b provided on the member 36 are adapted to co-operate with the push-rod 56.

As regards the control device for the balancing lever, this is constituted by a member 60 in the shape of a Z (see Fig. 10) which can slide on two parallel shafts 61a and 61b supported close to the extremities of the arms 4. This sliding Z member is connected by a small rod 13 to the casing 16 which contains the thrust bearing 17. This member 60 comprises, in addition, an inclined portion 62, the slope of which is judiciously chosen and in which is adapted to slide the ball-joint 9 mounted at the extremity of the balancing lever. In order that the small arm 8 and the lever 6 may fully take part in the movements of the aileron and be securely retained in place in the position shown in dotted lines in Fig. 1, the ball-joint 9 is extended by a small cylinder 63 (Figs. 7 and 11), also shown in chain-dotted lines in Fig. 10. This cylinder is kept within two generators between two slides 64a and 64b mounted on the rear face of the member 60, but which are not shown on Fig. 11. On the other hand, clearances 65a and 65b are provided in the groove 62 so as to enable the cylinder 63 to be disengaged from between the slides 64a and 64b.

The arrangement in accordance with the invention operates in the following manner:

For an angular movement of the aileron less than an angle α, the ball-joint 9 (shown in dotted lines in Fig. 7) is half-way along the sloping face or oblique groove 62, and this ball-joint is retained firmly and securely in position through the medium of the cylinder 63 and the slides 64a and 64b, so that the small arm 8 and the lever 6 may be considered as being rigidly coupled for movement to the aileron 1, and the assembly takes up, for example, the position shown in dotted lines in Fig. 1. The mechanism is disengaged in this position.

But when the aileron exceeds the angle α, the finger 35 comes into contact either with the stop 45a or with the stop 45b and will tend to take with it the member 36. At that time, the push-rod 40 is freed from the housing 42, which is secured in the fixed ring 39a integral with the wing, by the action of the corresponding one of the cams 48a and 48b. As the movement of the finger 35 continues, the member 36, which carries the toothed segment 20a, causes the rotation of the very small pinion 22 with which it is engaged. This small pinion, through the medium of the large pinion 24, considerably multiplies the initial angular displacement and actuates the pinion 25 of the hollow shaft 26, which causes the screw 27 to advance or go back in the direction of the arrows D, E (see Fig. 11) since this screw is prevented from turning by the key 29. Since the screw 27 is formed on the shaft 18, the latter pulls or pushes the thrust casing 16 which communicates its movement to the small rod 13. During the lateral movement of this shaft, the roller 50 is raised by moving up the edges of the groove 49. Its guide 52 is retained by the key 53 and transmits its movement through the intermediary of the crank-arm 54 and the lever 55 to the push-rod 56 located behind the finger 35. This finger is then in abutment against the stop 45a or stop 45b and enables the push-rod 56 to engage either in the housing 57a or in the housing 57b. From this moment, the member 36, which carries the toothed segment 20a, is controlled by the movements of the aileron and the device is then said to be engaged.

On the other hand, the small rod 13 communicates its movement to the member 60 which is, for example, pushed. The cylinder 63 is freed from the slides by means of the clearances 65a and 65b, and the ball-joint, guided between the two faces of the groove 62 by virtue of the suitable slope of this groove, lowers or raises the counter-weight 7, so that the latter remains within the internal limits of the section of the wing.

At the limit of this travel, there is obtained the position following the vertical plane OZ, median to the axis of the lever 6, as shown in Fig. 10, and the position in full lines shown in Fig. 7.

When the aileron returns to its former position, the upper push-rod 56 carries along the member 36 until the roller 50 falls again into the groove 49 under the pressure of the return-spring 59. The upper push-rod 56 will then be raised by the force of its spring 58 and will free the member 36, which then returns to its central position. At this moment, the lower push-rod 40, acting under the pressure of the two light springs 43a and 43b, will be engaged in its housing 42 and will thus fix the member 36 in position. The finger 35 will leave the stop 45a or 45b and will again become free to oscillate between the two abutments 45a and 45b without driving the mechanism, since the toothed segment 20a will be stationary.

It is to be noted that in practice, the different operations of the lower push-rod, of the upper push-rod, and of its actuating roller and, on the other hand, also the disengagement of the cylinder from the slides, are all carried out simultaneously and should overlap to some small extent. A suitable adjustment will enable correct operation to be obtained.

The total angular movement of the aileron may be increased by providing supplementary multiplying gears.

The nature of the invention will nevertheless not be modified if, instead of allowing the ball-joint 9 to rest directly on the two faces of the slope 62, the ball-joint is enclosed in a trolley provided with rollers so as to provide improved contact faces.

Finally, it is also to be noted that, during the whole period of its angular displacement during which the mechanism is not engaged, the aileron, elevator control, rudder, etc., are directly balanced by the counter-weight fixed to the extremity of the large lever, without the intermediary of any mechanism. There is therefore no fear of the introduction of disturbing elements into the balancing arrangement during this most important period, since it is this period which corresponds to high-speed flight and to normal flight, during which correct and sure balancing is a necessity.

It is furthermore to be understood that the present invention has been described purely by way of explanation and not in any restrictive sense and that any useful modification may be made thereto without departing from its scope as embraced in the annexed claims. Thus, in particular, a certain number of balancers may be provided for the same control member, the control of these balancers being carried out, for example, from the same shaft 18 and by means of members 60 connected to each other by means of connecting-rods such as 13a.

Having thus described the invention, what is claimed as new and desired to be secured by Letters Patent, is:

1. An automatic balancing device for the control-surfaces of aircraft comprising in combination, a control-surface arranged at the rear of and in the extension of the wing of an aircraft, providing a pivotal axis for the said control-surface, for pivotal movement of the latter relative to said wing, an arm integral with the said control-surface and arranged and adapted to remain continually within the interior of the section of the said wing, a shaft mounted on the said arm, at least one balancing lever mounted on the said shaft and pivotally attached thereto, the said shaft dividing the said lever into two arms of unequal length, one a long arm directed towards the front of the wing and the other a short arm directed towards the rear of the wing, the long arm carrying at its extremity a counter-weight, a mechanical control device actuated by the said control-surface, and means connecting the extremity of said short arm to said control device, the said last-mentioned device being constituted by a toothed segment integral with a lateral rib of the said control-surface, a train of reduction-gears operatively connected to said segment, a nut rotatably driven by the said gears, and a threaded shaft located parallel to the said pivotal axis of the control-surface and within the interior of the wing, said nut being mounted on said threaded shaft and adapted to be fixed longitudinally with respect thereto, means for preventing the said threaded shaft from rotating, the said threaded shaft being adapted to carry out axial movements, and a system of levers coupling the said threaded shaft to the extremity of the said short arm of the balancing lever, said system of levers constituting said means connecting said short arm to said control device, whereby the desired pivotal movement of the balancing lever with respect to the control-surface is carried out and to every angular position of the said control-surface there corresponds a position of the said balancing lever which is always comprised within the limits of the wing inside which the said balancing lever is housed.

2. An automatic balancing device for aircraft control-surfaces in accordance with claim 1, said toothed segment, said gears, said nut and said threaded shaft of said control device and said lever system being so arranged that when the control-surface pivots in one direction, the balancing lever pivots in the opposite direction with respect thereto.

3. An automatic balancing device for an aircraft control-surface pivotally connected to an element of said aircraft, comprising in combination an arm integral with said control-surface and extending into said element, said arm being arranged and adapted to remain continually within the interior of said element, a shaft mounted on said arm and disposed within the confines of said element, at least one balancing lever mounted intermediate its ends on said shaft and pivotally attached thereto, said shaft dividing the said lever into two arms of unequal length, the longer arm of said lever being directed toward the front of said element and the shorter arm of said lever being directed toward the rear of said element, a counter-weight carried by said longer arm at the free extremity of the latter, motion transmission means connected to said shorter arm at the free extremity of the latter, and actuating means interconnected between said control-surface and said transmission means for operating the latter to vary the position of said lever and said weight in response to variation in the position of said control-surface relative to said element, whereby to each angular position of said control-surface there corresponds a position of said balancing lever which is always comprised within the limits of said element inside which said lever is housed.

4. A balancing device for aircraft control-surfaces, comprising in combination a control-surface arranged at the rear of and in the extension of the wing of an aircraft, means providing a pivotal axis for said control-surface for pivotal movement of the latter relative to said wing, a spar and a lateral rib for said control-surface located rearwardly of said axis, an arm integral with said spar of said control-surface and arranged and adapted to remain continually within the interior of the section of said wing, a shaft mounted on said arm, at least one balancing lever mounted on said shaft and pivotally attached thereto, said shaft dividing said lever into two arms of unequal length, one a long arm directed toward the front of the said wing and the other a short arm directed toward the rear of the said wing, said long arm carrying at its forward extremity a counter-weight, said short arm carrying a ball-joint at its rearward extremity, a mechanical control device arranged for actuation by said control-surface, said control device comprising a toothed segment integral with said lateral rib of said control-surface, a train of reduction-gears in operative engagement with said toothed segment, a nut rotatably driven by said gears, and a threaded shaft disposed parallel to said pivotal axis of said control-surface and within the wing, said nut being mounted on said threaded shaft and adapted to be longitudinally fixed with respect thereto, key and groove means for preventing rotation of the said threaded shaft, said threaded shaft being arranged to carry out lateral movements, a system of levers coupling said threaded shaft to said ball-joint at said rearward extremity of said short arm of said balancing lever, said system of levers comprising a bell-crank-lever including on the one hand a first, long horizontal arm extending substantially parallel to said pivotal axis of said control-surface and carrying a casing in which is housed said ball-joint, and including on the other hand a second small arm, and a connecting-rod pivotally attached to said second arm and to said threaded shaft and actuated by the latter, whereby upon lateral movement of said threaded shaft in response to pivotal movement of said control-surface the desired pivotal movement of said balancing lever with respect to the control-surface is effected, and to each angular position of said control-surface there corresponds a position of said balancing lever always comprised within the limits of the wing inside which said balancing lever is housed.

5. A balancing device for aircraft control-surfaces, comprising in combination, a control-surface arranged at the rear of and in the extension of the wing of an aircraft, means providing a pivotal axis for said control-surface for pivotal movement of the latter relative to said wing, a spar for said control-surface and located rearwardly of said axis, an arm integral with said spar of said control-surface and arranged and adapted to remain continually within the interior of the section of said wing, a shaft mounted on said arm, at least one balancing lever mounted on said shaft and pivotally attached thereto, said shaft dividing said lever into two arms of unequal length, one a long arm directed toward the front of said wing and the other a short arm directed toward the rear of said wing, said long arm carrying at its extremity a counter-weight, said short arm carrying a ball-joint at its extremity directed toward said control-surface, a mechanical control device arranged for actuation by said control-surface, said control device comprising a toothed segment rotatably mounted on said control-surface and having an engagement portion, a train of reduction-gears in operative engagement with said toothed segment, a nut rotatably driven by said gears, a casing fixed to said spar, and a threaded shaft housed within the interior of said casing and located parallel to said pivotal axis of said control-surface and inside said wing, said nut being mounted on said threaded shaft and adapted to be longitudinally fixed relative thereto, key and groove means for preventing rotation of said threaded shaft, said threaded shaft being adapted to carry out lateral movements, a system of levers coupling said threaded shaft to said extremity of said short arm of said balancing lever, said lever system comprising a connecting-rod, a Z-shaped member coupled to said rod, two parallel shafts mounted close to the extremity of said arm integral with said control-surface, said Z-shaped member being arranged for sliding movement on said parallel shafts, said Z-shaped member being provided with a sloping face constituting a guide track for said ball-joint of said short arm of said balancing lever, means for retaining said ball-joint in a fixed position on said sloping face, a pair of abutments fixedly connected to said engagement portion of said toothed segment and arranged on opposite sides of the axis of rotation of said segment, finger means operatively connected with said control-surface and disposed between said abutments for engagement with the latter upon pivotal movement of said control-surface through an angle in excess of a predetermined value, push-rod means normally disengaged from said engagement portion of said toothed segment, and means actuated by said threaded shaft upon lateral movement of the latter beyond a predetermined position for bringing said push-rod means into contact with said engagement means in response to pivotal movement of said control-surface through an angle in excess of said predetermined value, whereby said balancing lever is momentarily coupled to said control-surface when the angle of movement of the latter is of low value, so that said control-surface may oscillate freely without connection with said control device actuating said balancing lever, the latter taking up corresponding positions within the section of said wing, while upon angular movement of large amplitude said control-surface actuates said control device in such a manner that said balancing lever remains always within the interior of the section of said wing.

References Cited in the file of this patent

UNITED STATES PATENTS

| 2,556,351 | Tulley | June 12, 1951 |

FOREIGN PATENTS

| 423,752 | Great Britain | Feb. 7, 1935 |
| 678,479 | Germany | July 17, 1939 |